United States Patent
Wilm et al.

(10) Patent No.: US 12,529,996 B2
(45) Date of Patent: Jan. 20, 2026

(54) METHOD FOR PRODUCING A HOLOGRAPHIC OPTICAL ELEMENT, CONTROL DEVICE AND EXPOSURE DEVICE

(71) Applicant: Robert Bosch GmbH, Stuttgart (DE)

(72) Inventors: Tobias Wilm, Heimsheim (DE); Johannes Hofmann, Tuebingen (DE); Reinhold Fiess, Durbach (DE)

(73) Assignee: Robert Bosch GmbH, Stuttgart (DE)

(*) Notice: Subject to any disclaimer, the term of this patent is extended or adjusted under 35 U.S.C. 154(b) by 654 days.

(21) Appl. No.: 17/898,705

(22) Filed: Aug. 30, 2022

(65) Prior Publication Data
US 2023/0090984 A1   Mar. 23, 2023

(30) Foreign Application Priority Data
Sep. 20, 2021   (DE) .................... 10 2021 210 379.0

(51) Int. Cl.
*G03H 1/04*   (2006.01)

(52) U.S. Cl.
CPC ......... *G03H 1/0402* (2013.01); *G03H 1/0465* (2013.01); *G03H 2001/0439* (2013.01)

(58) Field of Classification Search
CPC ............... G03H 1/0402; G03H 1/0465; G03H 2001/0439; G03H 1/0248; G03H 1/0808; G03H 1/2645; G03H 2240/53; G02B 2027/0174
USPC ....................................................... 430/1, 2
See application file for complete search history.

(56) References Cited

FOREIGN PATENT DOCUMENTS

WO   WO2019228280   * 12/2019

* cited by examiner

*Primary Examiner* — Caleen O Sullivan
(74) *Attorney, Agent, or Firm* — Norton Rose Fulbright US LLP

(57) ABSTRACT

A method for producing a holographic optical element. The method includes a step of exposing a recording material to a phase pattern which is provided by a first modulated light beam with a first phase portion. Furthermore, the method includes a step of an additional exposure of the recording material to the phase pattern, which is provided by a second modulated light beam with a second phase portion, wherein the second phase portion has a phase offset with respect to the first phase portion in order to produce a holographic optical element.

10 Claims, 3 Drawing Sheets

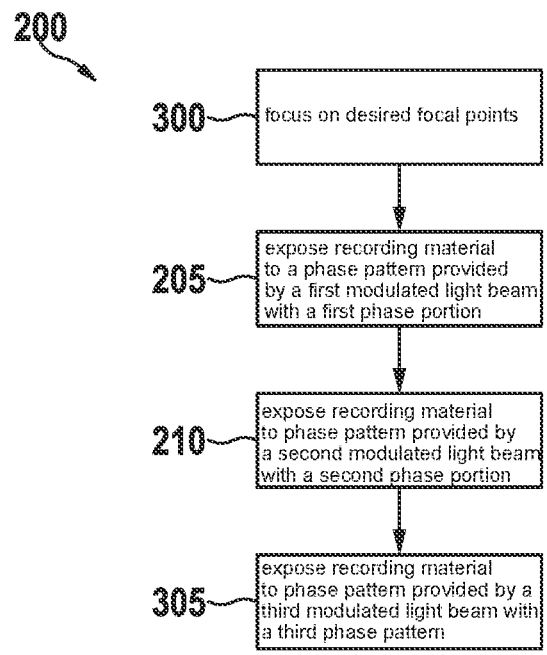
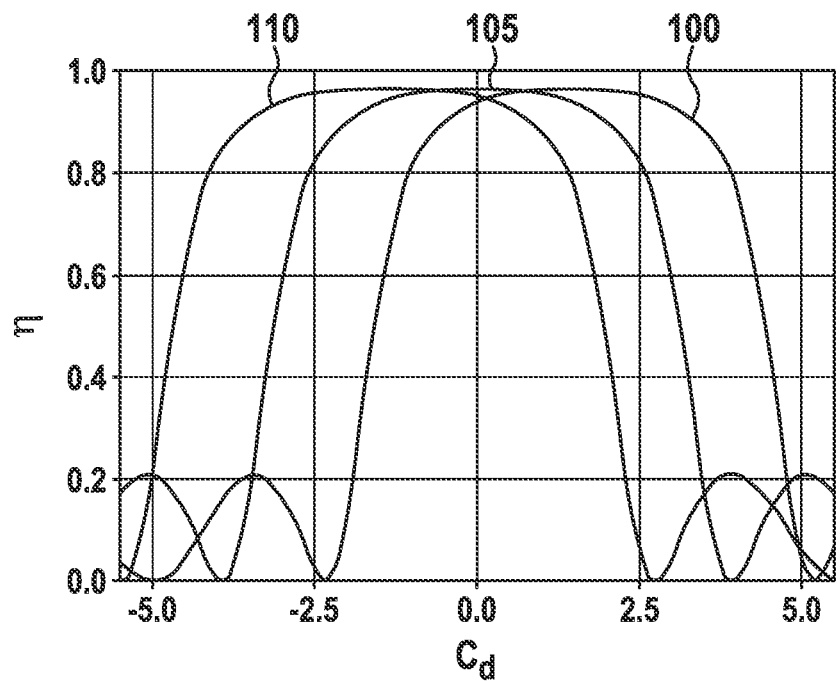

METHOD FOR PRODUCING A HOLOGRAPHIC OPTICAL ELEMENT, CONTROL DEVICE AND EXPOSURE DEVICE

CROSS REFERENCE

The present application claims the benefit under 35 U.S.C. § 119 of German Patent Application No. DE 10 2021 210 379.0 filed on Sep. 20, 2021, which is expressly incorporated herein in its entirety.

FIELD

The present invention relates to a method for producing a holographic optical element, a control device, and an exposure device. The subject-matter of the present invention is also a computer program.

BACKGROUND INFORMATION

The fields of application for holographic optical elements (HOEs) are novel display or sensor systems. Possible areas of application such as data eyeglasses or transparent display systems based on holographic diffusers have a great potential and can be realized by using HOEs. The (series) production of, in particular, large-area HOEs is based on complex special bodies that generate recording waves in the target size of the HOEs in order either to directly expose a HOE or to replicate a master hologram. Another approach consists in the replication of master holograms with, for example, a scanned laser beam. In conventional recording methods, in particular the laser waves used for exposing a specific local holographic structure are invariable during the exposure process of this structure.

SUMMARY

Present invention provides a method for producing a holographic optical element, also a control device that uses this method and an exposure device, as well as finally a corresponding computer program. Advantageous embodiments, developments, and improvements of the method according to the present invention are disclosed herein.

The production process of holographic optical elements can be optimized with the method presented here. An advantage of the method provided is that the bandwidth of a hologram is increased without increasing the diffraction efficiency.

According to an example embodiment of the present invention, a method for producing a holographic optical element is provided, wherein the method comprises a step of exposing a recording material to a phase pattern which is provided by a first modulated light beam having a first phase portion. In addition, the method comprises a step of an additional exposure of the recording material to the phase pattern, which is provided by a second modulated light beam with a second phase portion, wherein the second phase portion has a phase offset with respect to the first phase portion in order to produce a holographic optical element.

A holographic optical element (HOE) can be understood as a three-dimensional element with a specific optical function, which is inscribed in a corresponding recording material as an interference grating and which can also be referred to as a holographic film. Holographic optical elements and their production can be studied, for example, in the field of data eyeglasses development. In this case, in particular the angular and wavelength bandwidths of the produced HOEs can be of great relevance in ensuring that the product is robust as regards tolerances in production and operation. Since the angular and wavelength bandwidths of volume hologram structures are linked to one another by the underlying phenomenon of grating diffraction, diffraction efficiency can depend on the choice of the recording parameters. In order to counteract this phenomenon, the method presented here makes it possible to use a novel procedure in the exposure of holograms, which, for example, can be realized by means of an exposure process by a holographic wavefront exposure device. For this purpose, the wavefronts of the two recording waves can be adapted individually and independently of one another. This can enable the realization of a novel HOE recording process, which advantageously makes it possible to specifically increase the angular and wavelength bandwidths of a holographically-inserted volume hologram, in particular for a specific target value for the diffraction efficiency. For this purpose, the method presented is divided into at least two exposure steps. For each step, an individual adaptation of the phase function of the recording wavefront is performed, which is designed so as to produce overall an HOE with a specifically influenced bandwidth without influencing the desired target function of the HOE. The decisive advantage of the method presented is therefore the increase in the bandwidth of a hologram without the need to tolerate an increase in the diffraction efficiency.

The method provided according to an example embodiment of the present invention may advantageously allow for an adaptation of the bandwidth of holographic structures with different wavelength contributions and also for a simultaneous adaptation of the maximum diffraction efficiency. Such an adaptation can be highly relevant for holograms, for example, which are used in data eyeglasses, since here holographic functions in the blue, green and red spectral ranges are realized. Due to the different wavelength contributions, an independent adaptation of bandwidth and diffraction efficiency is necessarily required. Blue and red holograms, for example, can have approximately the same bandwidth in data eyeglasses, but should also have a diffraction efficiency that is as close to identical as possible. This is hardly possible when using conventional methods due to the relationship between bandwidth and diffraction efficiency as a function of wavelength. In addition, the present invention is highly relevant in particular for fluorescence-based diagnostics, for example in lab-on-chip technology since HOE-based optical filters are to be used here in future. For this purpose, it is likewise necessary to adapt the bandwidth of the holographic structure to the spectral bandwidth of the excitation LEDs as well as of the fluorescent substances. For this purpose, an adaptation of the bandwidth is also advantageous in order to be able to optimally utilize the filter properties of an HOE as a bandpass filter. In this case, for example, the wide spectrum of an LED is to be limited to a very narrow usable range (approximately 15 nm, better 10 nm) by means of an HOE. Since several tests with spectrally different LEDs are always carried out sequentially in lab-on-chip systems, an adaptation of the HOE diffraction efficiency of the individual spectral components results in additional advantages for the analysis.

According to one example embodiment of the present invention, the method may comprise a step of further exposing the recording material with the phase pattern that can be provided by a third modulated light beam with a third phase portion. The third phase portion can have a phase offset from the first and second phase portions. The phase offset of the third recording angle can, for example, correspond to the phase offset of the second recording angle with respect to the first recording angle. Likewise, a variable number of further exposure steps can be carried out using the same procedure, wherein the respective phase offset between the phase portions can remain constant. The diffraction efficiency may be based on the Fourier theory of diffraction. A diffracting structure can be described by an ideal cosine function and generate a discrete diffraction direction during an exposure with monochromatic light. The spectral or angular bandwidth of the diffracting structure can then be determined from its spatial extent. This means that the discrete diffraction direction can be convoluted by means of a slit function, for example, a cardinal sine function. By imprinting a plurality of wavefronts with different phase offsets into the same position of the holographic film, the resulting interference grating can advantageously result in an envelope consisting of the functional components of the individual contributions. With regard to the bandwidth of the structure produced by the method described, it may be possible that the convolution of the cosine function in the reciprocal frequency domain takes place via a continuum of several cosine functions with different phase angles. The diffraction characteristic of the generated structure can thus advantageously have an enlarged spectral or angular bandwidth due to the convolution across a continuum of split functions.

According to a further embodiment of the present invention, the method steps can be carried out sequentially one after another. The HOE recording process can, for example, be composed of a plurality of independent exposure steps with a short time interval, which are performed sequentially one after another. Advantageously, the overall process can thereby be carried out inexpensively with a single device for exposing the recording material from different phase portions.

According to a further embodiment of the present invention, the method steps can be carried out at least partially simultaneously or at the same time. A plurality of exposure devices for exposing the recording material can be used in this case for example, wherein each device can output a modulated light beam with a phase portion offset with respect to the light beams of the other devices. A design that uses, for example, a plurality of exposure devices per exposure wavefront and can thus advantageously realize a simultaneous superpositioning of the adapted wavefronts in the holographic film would be possible. This has the advantage that the overall process can be carried out in a shorter period of time.

According to one example embodiment of the present invention, in the additional exposure step, the phase offset can be of a magnitude of maximally 10%. The phase offset between the first phase portion and the second phase portion can, for example, be 5%, as likewise the phase offset of the third phase portion with respect to the first and second phase portions. This has the advantage that the differences between the interference gratings generated can be very fine, as a result of which the complexity and functioning of the holographic optical element can be optimized. The phase offset of the individual exposure components is to be selected for example small enough (e.g. lambda/10) to be able to ensure that the resulting phase function is formed as a continuum and that no individual, disjunct phase components arise. For the holographic grating, this means that a continuous grating diffraction is formed over the desired wavelengths/angular range. If this step is not taken into account for example, disjunct holographic gratings are recorded for example, which during reconstruction do not behave like a single holographic diffraction grating.

According to a further embodiment of the present invention, the phase offset can be adjustable in or for the additional exposure step. For each exposure step of the hologram, for example, the angle or the magnitude of the grating vector can be adapted in a targeted manner and independently of one another in order to advantageously superimpose a plurality of contributions and thus achieve the desired change in the hologram bandwidth. An individual adaptation of the phase function of the recording wavefront for each method step can be set, for example, which can be designed so as to produce an HOE with a specifically influenced bandwidth without influencing the desired target function of the HOE.

According to a further embodiment of the present invention, the first modulated light beam can be provided in the exposure step as an object beam, with it being possible to use a reference beam that is provided by a same light source as the object beam. For example, a laser beam can be split into a reference beam and an object beam by means of a beam splitter. An object beam can be understood as a wave field representing a portion of a laser beam that is reflected and scattered by an object. A reference beam can be understood as a wave field that represents an unscattered portion of the same laser beam. In this case, an additional object beam can be used in the additional exposure step, as a result of which a plurality of object beams can be used in relation to a reference beam. Advantageously, a holographic optical element can thus be produced at a predefined depth of the recording material.

According to a further embodiment of the present invention, in the exposure step, the recording material can be exposed to the reference beam and the object beam from the same or alternatively from different sides. The recording material can be exposed from opposite sides, for example. This has the advantage that the holographic optical element can be produced in a middle layer of the recording material.

According to a further embodiment of the present invention, the method can comprise a step of adjustably focusing the first and additionally or alternatively the second light beam onto a desired focal point of the recording material. The recording material can have a thickness of 16 µm, for example. In the focusing step, the exposure can be set to a focal point, for example at a depth of 8 µm. Advantageously, such a focal point can be varied in different depth positions during the exposure step, depending on the requirements and place of use of the HOE produced.

This method can be implemented, for example, in software or hardware or in a mixed form of software and hardware, for example in a control device.

The present invention further provides a control device which is designed to carry out, control or implement in corresponding devices the steps of a variant of a method presented here. The object of the present invention can also be achieved quickly and efficiently by this design variant of the present invention in the form of a control device.

According to an example embodiment of the present invention, the control device can have at least one computing unit for processing signals or data, at least one memory unit for storing signals or data, at least one interface to a sensor or an actuator for reading in sensor signals from the sensor or for outputting data or control signals to the actuator and/or at least one communication interface for reading in or outputting data embedded in a communication protocol. The computing unit can be, for example, a signal processor, a microcontroller or the like, wherein the memory unit can be a flash drive, an EEPROM or a magnetic memory unit. The communication interface can be designed to read in or output data in a wireless and/or wired manner, wherein a communication interface, which can read in or output linebound data, can read in these data for example electrically or optically from a corresponding data transmission line or can output these data into a corresponding data transmission line.

In the present case, a control device can be understood to be an electrical device that processes sensor signals and on the basis of these signals outputs control and/or data signals. The control device can have an interface that can be designed as hardware and/or software. In a hardware embodiment, the interfaces can be part of a so-called system ASIC, which comprises a wide variety of functions of the control device. However, it is also possible for the interfaces to be separate integrated circuits or at least partially consist of discrete components. In the event of a software embodiment being used, the interfaces can be software modules that are present, for example, on a microcontroller in addition to other software modules.

In addition, an exposure device with a variant of the control device described above is presented. According to an example embodiment of the present invention, the exposure device can be designed as a so-called spatial light modulator (SLM). Such an exposure device can be used to control wavefronts, for example. Advantageously, this can make it possible for the spatial frequencies of the recording wavefronts to be able to be set in a precise manner. Furthermore, it is possible to introduce a controllable but constant additive angular contribution or phase contribution independently of the recording wavefronts. Possible other phase modulation variants can be realized with the aid of adaptive phase plates or deformable mirrors.

According to example embodiments of the present invention, a computer program product or a computer program with program code that can be stored on a machine-readable carrier or storage medium such as a semiconductor memory, a hard disk memory or an optical memory and that is used for performing, implementing and/or controlling the steps of the method according to any of the embodiments described above is advantageous as well, in particular when the program product or program is executed on a computer or a control device.

Exemplary embodiments of the present invention are illustrated in the figures and explained in more detail in the following description.

BRIEF DESCRIPTION OF THE DRAWINGS

FIG. 3 is a flow chart of a method for producing a holographic optical element according to one exemplary embodiment of the present invention.

FIG. 4 is a diagram of an exemplary embodiment of a diffraction-efficiency-independent bandwidth adaptation of a holographic optical element, according to the present invention.

DETAILED DESCRIPTION OF EXAMPLE EMBODIMENTS

In the following description of advantageous exemplary embodiments of the present invention, the same or similar reference signs are used for the elements shown in the various figures and acting similarly, a repeated description of these elements being dispensed with.

Figure 1:
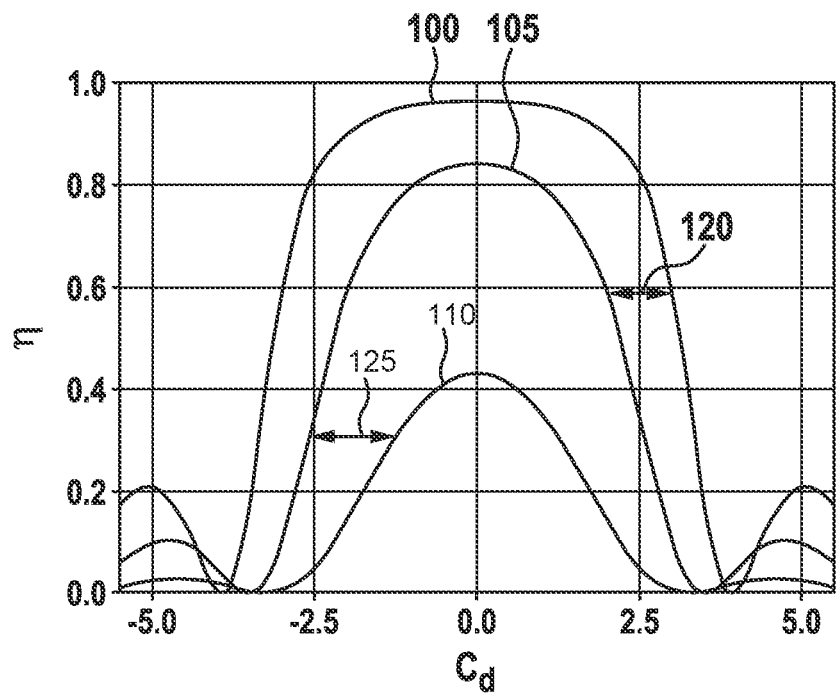
FIG. 1 is a diagram of an exemplary embodiment of a relationship between diffraction efficiency, coupling strength and the Kogelnik factor.

FIG. 1 is a diagram of an exemplary embodiment of a relationship between the diffraction efficiency η and the coupling strength $C_c$ and the Kogelnik factor $C_d$ in accordance with the Kogelnik coupled-wave model. In the illustration shown here, a first modulated light beam 100 with a first phase portion, a second modulated light beam 105 with a second phase portion and a third modulated light beam 110 with a third phase portion are shown only by way of example. Only by way of example, the first light beam 100 has a coupling strength $C_c/\Pi$ of 0.25, the second light beam 105 has a coupling strength $C_c/\Pi$ of 0.50 and the third light beam 110 has a coupling strength $C_c/\Pi$ of 0.75. The width of the respective peak of the light beams 100, 105, 110 is considered a measure of the bandwidth of a holographic optical element (HOE). In this case, the second modulated light beam 105 has a phase offset 120 from the first modulated light beam 100, likewise as the third modulated light beam 110 in this exemplary embodiment has a further phase offset 125 with respect to the second light beam 105 and thus also with respect to the first light beam 100.

The coupling strength of an HOE is considered a measure of the achievable diffraction efficiency. The equation shown below represents the coupling strength $C_c$ in accordance with the Kolgelnik coupled-wave theory.

$$C_c = \frac{\pi n_1 d}{\lambda_0 \cos\vartheta}$$

Here the coupling strength depends on the amplitude of the refractive index modulation $n_1$, the thickness of the holographic film d as well as the wavelength $\lambda_0$ and the angle $\vartheta$ of the incident light. The bandwidth of an HOE can be illustrated by means of the Kogelnik factor $C_d$. In this case, the deviation of the playback angle $\vartheta$ and the playback wavelength $\lambda_0$ from the ideal Bragg condition of the imprinted grating structure is taken into account. The deviation can correspond to the following form.

$$C_d = \left[\cos(\vartheta_K - \vartheta) - \frac{|K|\lambda_0}{4\pi n_0}\right] \cdot \frac{d|K|}{2\cos\vartheta}$$

Here $$|K| = \frac{2\pi}{\lambda_0}$$

describes the imprinted grating structure, $\vartheta_K$ describes the angle of the grating normal and $n_0$ describes the mean background refraction index. The bandwidth can thus be described with the aid of the diffraction efficiency as a function of the playback angle $\vartheta$ and the playback wavelength $\lambda_0$. The diffraction efficiency can correspond to the following term:

$$\eta(\vartheta, \lambda_0) = \left\{1 + \left(1 - \frac{C_d^2}{C_c^2}\right)\sinh^{-2}\left[(C_c^2 - C_d^2)^{1/2}\right]\right\}^{-1}$$

In the production of HOEs with conventional variants, there is in particular a trade-off between the coupling strength $C_c$ or the diffraction efficiency η and the bandwidth of an HOE. For conventional holography recording methods, for an increase in the bandwidth the factor $C_c$ must be increased. This inevitably also leads to an increase in the diffraction efficiency. The diffracting structure of a hologram can, corresponding to the imprinted interference pattern, be designed as a modulation of the refractive index in the holographic film. In this case, the interference pattern can be created by the interference of two coherent HOE recording waves with an intensity distribution that can correspond to the following form.

$$I_{int}(r) = I_1 + I_2 + 2(I_1 I_2)^{1/2} \cdot \cos((k_1 - k_2) \cdot r + \delta)$$

The form of the interference function can be described by the ideal cosine function. $I_1$ and $I_2$ describe the intensities of the interfering waves with the location vector r as well as the spatial frequencies $k_1$ and $k_2$ of the recording wavefronts.

Figure 2:
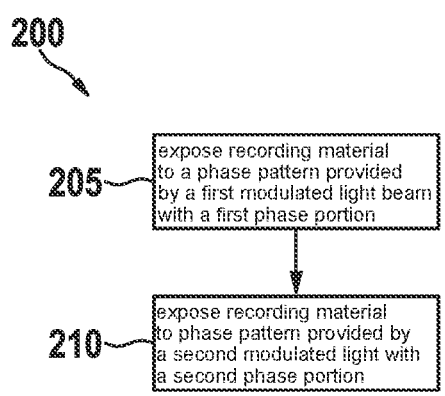
FIG. 2 is a flow chart of a method for producing a holographic optical element according to one exemplary embodiment of the present invention.

FIG. 2 is a flow chart of a method 200 for producing a holographic optical element according to one exemplary embodiment. The method 200 comprises a step 205 of exposing a recording material to a phase pattern which is provided by a first modulated light beam with a first phase portion. The first modulated light beam is only an example of a laser beam that was split by means of a beam splitter into a reference beam and an object beam. In this exemplary embodiment, the first modulated light beam is thus provided as an object beam on one side of the recording material, while the recording material is simultaneously only by way of example exposed to the reference beam from another side.

Furthermore, the method 200 comprises a step 210 of an additional exposure of the recording material to the phase pattern, which is provided by a second modulated light beam with a second phase portion, wherein the second phase portion has a phase offset from the first phase portion in order to produce a holographic optical element. Only by way of example, in this additional exposure step 210 the phase offset is adjustable and has a magnitude of maximally 5%. In this exemplary embodiment, steps 205, 210 of the method 200 are performed sequentially. In another exemplary embodiment, the steps can even be carried out simultaneously and the phase offset can have a variable magnitude of maximally 10%.

The method 200 described here represents a new type of recording process of a holographic optical element (HOE), which, in comparison to a conventional exposure process, comprises a plurality of independent exposure steps which occur sequentially one after another. For this purpose, for each step, an individual adaptation of the phase function of the recording wavefront is performed, which is designed so as overall to produce an HOE with a specifically influenced bandwidth without influencing the desired target function of the HOE. In conventional recording methods of holography, an increase in the bandwidth is necessarily accompanied by an increase in the diffraction efficiency. A high diffraction efficiency is, however, in particular counterproductive for applications focusing on high transparency, because the influence of interference light or interference holograms is also amplified by the increased diffraction efficiency. These include in particular applications for holograms of data eyeglasses and for head-up displays. The decisive advantage of the method presented is therefore the increase in the bandwidth of a hologram without the need to tolerate an increase in diffraction efficiency.

FIG. 3 is a flow chart of a method 200 for producing a holographic optical element according to one exemplary embodiment. The method shown here corresponds to or is similar to the method described in the preceding FIG. 2, with the difference that it has additional steps. Thus, in this exemplary embodiment, an adjustable focusing step 300 precedes the exposure step 205. In this step 300, the light beams provided in the following steps are, only by way of example, focused on a desired focal point of the recording material.

In addition, in this exemplary embodiment, step 210 of the additional exposure is followed by a further exposure step 305. The recording material is exposed to the phase pattern which is provided by a third modulated light beam with a third phase portion, wherein the third phase portion has a phase offset with respect to the first and with respect to the second phase portion.

The diffracting structure of a hologram is formed as a modulation of the refractive index in the holographic film according to the imprinted interference pattern. The interference pattern is generated by the interference of two coherent HOE recording waves with an intensity distribution that can have the following form.

$$I_{int}(r) = I_1 + I_2 + 2(I_1 I_2)^{1/2} \cdot \cos((k_1 - k_2) \cdot r + \delta)$$

The form of the interference function is described by the ideal cosine function. $I_1$ and $I_2$ describe the intensities of the interfering waves with the location vector r as well as the spatial frequencies $k_1$ and $k_2$ of the recording wavefronts.

In this exemplary embodiment, the spatial frequencies $k_1$ and $k_2$ of the recording wavefronts are precisely set. Furthermore, the introduction of a controllable but constant additive angular contribution or phase contribution 5 is made possible independently of the recording wavefronts. Applied to the Kogelnik factor $C_d$, this results in a change to the parameters $\vartheta_K$ or $|K|$, which corresponds to a changed exposure angle or an additive phase contribution.

The diffraction efficiency results according to the Fourier theory of diffraction. A diffracting structure is described here by an ideal cosine function and generates a discrete diffraction direction in the case of exposure to monochromatic light. The spectral or angular bandwidth of the diffracting structure is then determined by its spatial extent. This means that the discrete diffraction direction is convoluted with a split function, for example, a cardinal sine function. By imprinting a plurality of wavefronts with a different phase offset at short intervals into the same position of the holographic film, the resulting interference grating results in an envelope consisting of the functional components of the individual contributions. For each exposure step of a hologram the angle or the magnitude of the grating vector is adapted in a targeted manner and independently of one another in order to superimpose a plurality of contributions and thus achieve the desired change in the hologram bandwidth. With regard to the bandwidth of the structure produced by the method described, the convolution of the cosine function in the reciprocal frequency domain takes place via a continuum of several cosine functions with different phase angles. The diffraction characteristic of the generated structure thus has an enlarged spectral or angular bandwidth due to the convolution across a continuum of split functions.

FIG. 4 is a diagram of an exemplary embodiment of a diffraction-efficiency-independent bandwidth adaptation of a holographic optical element. A first modulated light beam 100 with a first phase portion, a second modulated light beam 105 with a second phase portion and a third modulated light beam 110 with a third phase portion are shown in this embodiment, similar to the diagram described in the preceding FIG. 1. Only by way of example, the first light beam 100 has a coupling strength $C_c/\Pi$ of $1.05\cdot/K/$, the second light beam 105 has a coupling strength $C_c/\Pi$ of $1.0\cdot/K/$ and the third light beam 110 has a coupling strength $C_c/\Pi$ of $0.95\cdot/K/$. In this exemplary embodiment, the diffraction efficiency η is independent of the bandwidth adaptation, because the imprinted grating structure is adapted by applying a method as described in the preceding FIGS. 2 and 3. Accordingly, an adjustment is made possible by introducing an additive angle contribution or phase contribution.

Figure 5:
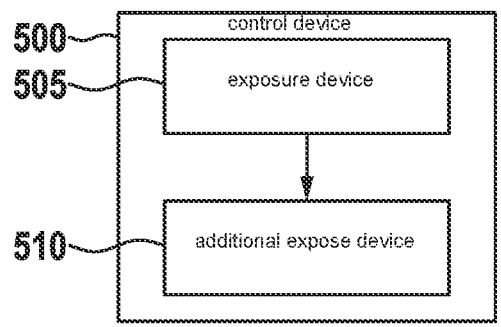
FIG. 5 is a block diagram of a control device according to one exemplary embodiment of the present invention.

FIG. 5 is a block diagram of an exemplary embodiment of a control device 500 for controlling a method for producing a holographic optical element according to a variant presented here. The control device 500 comprises an exposure device 505 for controlling an exposure of a recording material to a phase pattern which is provided by a first modulated light beam with a first phase portion. In addition, the control device 500 comprises an additional exposure unit 510 for controlling an additional exposure of the recording material to the phase pattern, which is provided by a second modulated light beam with a second phase portion, wherein the second phase portion has a phase offset with respect to the first phase portion in order to produce a holographic optical element.

Figure 6:
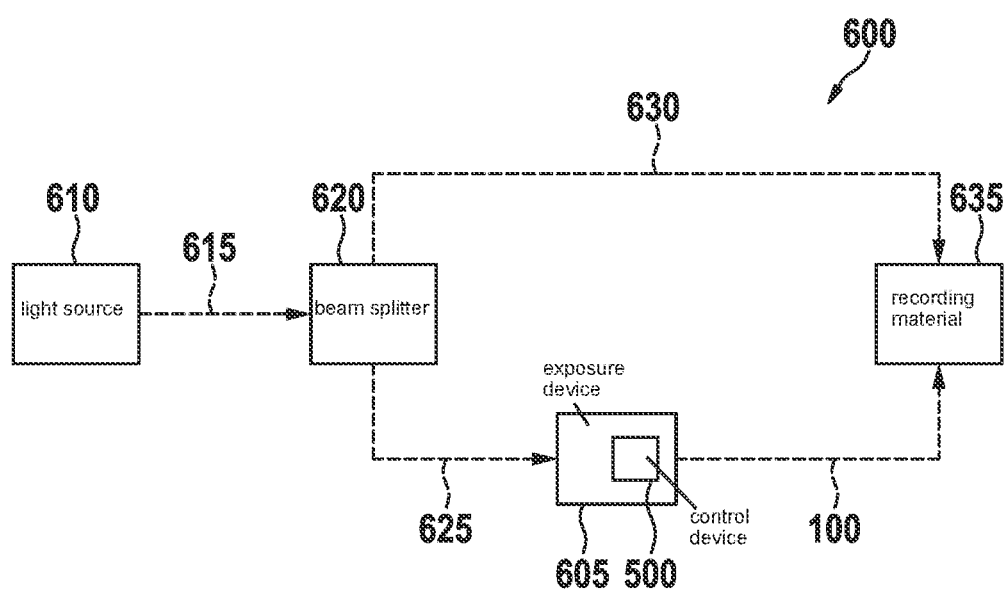
FIG. 6 is a block diagram of a system with an exposure device according to one exemplary embodiment of the present invention.

FIG. 6 is a block diagram of a system 600 with an exposure device 605 according to one exemplary embodiment. In this exemplary embodiment, the system 600 comprises a light source 610, which only by way of example is formed to provide a laser beam 615. By means of a beam splitter 620, the laser beam 615 can be split into an object beam 625 and a reference beam 630 in order to expose a recording material 635 from opposite sides, for example. In this case, the object beam 625 can be modulated by an exposure device 605 to form a first light beam 100, wherein the exposure device 640 in this exemplary embodiment comprises a control device 500 which corresponds to or is similar to the control device described in the preceding FIG. 5. In this exemplary embodiment, the exposure device 605 can be used for controlling wavefronts or for precisely setting the spatial frequencies of the recording wavefronts. In addition, it is possible to introduce a controllable but constant additive angular contribution or phase contribution independently of the recording wavefronts. A method for producing a holographic optical element can therefore be realized as described in the preceding FIGS. 2 and 3 by means of the exposure device, which can also be referred to as a holographic wavefront exposure device or spatial light modulator (SLM). In other words, the wavefronts of the two recording waves can be adapted individually and independently of one another by means of the wavefront exposure device. This enables the realization of a novel HOE recording process, which makes it possible to specifically increase the angular and wavelength bandwidth of a holographically-inserted volume hologram, in particular for a specific target value for the diffraction efficiency.

If an exemplary embodiment has an "and/or" link between a first feature and a second feature, this is to be understood to mean that the exemplary embodiment according to one specific embodiment has both the first feature and the second feature and, according to a further specific embodiment, has either only the first feature or only the second feature.

What is claimed is:

1. A method for producing a holographic optical element, the method comprising the following steps:
   exposing a recording material to a phase pattern which is provided by a first modulated light beam having a first phase portion; and
   additionally exposing the recording material to the phase pattern which is provided by a second modulated light beam having a second phase portion, wherein the second phase portion has a phase offset with respect to the first phase portion, to produce the holographic optical element.

2. The method according to claim 1, further comprising:
   further exposing the recording material to the phase pattern which is provided by a third modulated light beam having a third phase portion, wherein the third phase portion has a phase offset with respect to the first phase portion and with respect to the second phase portion.

3. The method according to claim 1, wherein the steps of the method are performed sequentially one after another.

4. The method according to claim 1, wherein the steps of the method are carried out at least partially simultaneously or at the same time.

5. The method according to claim 1, wherein, in the additional exposure step, the phase offset has a magnitude of maximally 10%.

6. The method according to claim 1, wherein the phase offset is adjustable in or for the additional exposure step.

7. The method according to claim 1, wherein, in the exposure step, the first modulated light beam is provided as an object beam, wherein a reference beam is used which is provided by the same light source as the object beam.

8. The method according to claim 7, wherein, in the step of exposing, the recording material is exposed to the reference beam and to the object beam on the same or alternatively on different sides.

9. The method according to claim 1, further comprising:
   adjustably focusing the first and/or second light beam onto a desired focal point of the recording material.

10. A non-transitory machine-readable storage medium on which is stored a computer program for producing a holographic optical element, the computer program, when executed by a computer, causing the computer to perform the following steps:
   exposing a recording material to a phase pattern which is provided by a first modulated light beam having a first phase portion; and
   additionally exposing the recording material to the phase pattern which is provided by a second modulated light beam having a second phase portion, wherein the second phase portion has a phase offset with respect to the first phase portion, to produce the holographic optical element.

* * * * *